United States Patent
Casucci et al.

(10) Patent No.: US 12,242,289 B2
(45) Date of Patent: Mar. 4, 2025

(54) TEMPERATURE SENSORS FOR A COOKING APPLIANCE

(71) Applicant: WHIRLPOOL CORPORATION, Benton Harbor, MI (US)

(72) Inventors: Marco Casucci, Varese (IT); Simone Emanuele Ceron, Varese (IT); Luca Corbo, Comabbio (IT); Alessandro Gigante, Varese (IT); Marta Maria Teresa Taverna, Milan (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 430 days.

(21) Appl. No.: 17/571,595

(22) Filed: Jan. 10, 2022

(65) Prior Publication Data

US 2023/0221741 A1   Jul. 13, 2023

(51) Int. Cl.
*F24C 15/16*   (2006.01)
*G05D 23/19*   (2006.01)

(52) U.S. Cl.
CPC ......... *G05D 23/1934* (2013.01); *F24C 15/16* (2013.01)

(58) Field of Classification Search
CPC ............... F24C 15/16; G05D 23/1934; G05D 23/1927; G05D 23/193
See application file for complete search history.

(56) References Cited

U.S. PATENT DOCUMENTS

| | | | |
|---|---|---|---|
| 2,906,124 A | 9/1959 | Chaney | |
| 7,071,448 B1* | 7/2006 | Kim | F24C 15/16 219/400 |
| 7,128,466 B2 | 10/2006 | Chang et al. | |
| 7,183,520 B2* | 2/2007 | Park | H05B 6/642 219/394 |
| 7,381,933 B2 | 6/2008 | Cristiani | |
| 7,420,140 B2* | 9/2008 | Lenhart, Jr. | F24C 7/087 219/486 |
| 8,453,984 B2 | 6/2013 | Best et al. | |
| 8,803,045 B2* | 8/2014 | Cadima | H05B 6/1236 99/324 |
| 10,599,168 B2* | 3/2020 | Raghavan | A47J 37/00 |
| 10,641,498 B2 | 5/2020 | Blum et al. | |
| 11,408,611 B2* | 8/2022 | Moore | F24C 15/02 |
| 11,561,011 B2* | 1/2023 | Ceron | F24C 15/16 |

(Continued)

FOREIGN PATENT DOCUMENTS

DE   4202493   8/1992
DE   102010062504   6/2012

(Continued)

OTHER PUBLICATIONS

Shixiong Liu et al, "Investigation and modeling of temperature changes in food heated in a flatbed microwave oven," Dept. of Food Science and Tech. Tokyo University of Marine Science and Technology, 4-5-7, Konan, Minato-ku, Tokyo 108-8477, Japan (2014).

*Primary Examiner* — Gregory A Wilson
(74) *Attorney, Agent, or Firm* — PRICE HENEVELD LLP

(57) ABSTRACT

A cooking appliance includes a housing that defines a cooking cavity. A first temperature sensor is coupled to the housing and is configured to detect an air temperature of the cooking cavity. A rack is disposed within the cooking cavity and includes a second temperature sensor that is coupled to a frame of the rack.

13 Claims, 7 Drawing Sheets

(56) References Cited

U.S. PATENT DOCUMENTS

2018/0120167 A1     5/2018   Hammer et al.
2018/0143086 A1     5/2018   Stoufer et al.

FOREIGN PATENT DOCUMENTS

| DE | 102010062504 A1 * | 6/2012 | ............. F24C 15/16 |
|----|-------------------|--------|--------------------------|
| DE | 102016102233 | 8/2017 | |
| DE | 102016102260 | 8/2017 | |
| EP | 0641976 | 3/1995 | |
| GB | 2427027 | 12/2006 | |
| KR | 20210087386 A * | 7/2021 | |
| WO | 2018068976 | 4/2018 | |

* cited by examiner

TEMPERATURE SENSORS FOR A COOKING APPLIANCE

BACKGROUND OF THE DISCLOSURE

The present disclosure generally relates to a cooking appliance, and more specifically, to temperature sensors for a cooking appliance.

SUMMARY OF THE DISCLOSURE

According to one aspect of the present disclosure, a cooking appliance includes a housing and a rack that is coupled to the housing and has a frame. A divider is coupled to the housing proximate the rack. The divider defines a first cavity and a second cavity of the housing. A first temperature sensor is selectively coupled to the divider and is configured to detect an air temperature of the first cavity. A second temperature sensor is operably coupled to the frame of the rack via retention features. The second temperature sensor is configured to detect an air temperature of the second cavity.

According to another aspect of the present disclosure, a cooking appliance includes a housing that defines a cooking cavity. A first temperature sensor is selectively coupled to the housing and is configured to detect an air temperature of the cooking cavity. A rack is disposed within the cooking cavity and includes a second temperature sensor that is coupled to a frame of the rack.

According to yet another aspect of the present disclosure, a cooking appliance includes a housing that includes a divider that defines a first cavity and a second cavity. A first temperature sensor is integrally formed with the divider and is configured to detect an air temperature of the first cavity. A cooking vessel is disposed within the second cavity. A second temperature sensor is selectively coupled to the cooking vessel and is configured to detect an air temperature of the second cavity proximate the cooking vessel.

These and other features, advantages, and objects of the present disclosure will be further understood and appreciated by those skilled in the art by reference to the following specification, claims, and appended drawings.

Figure 1:
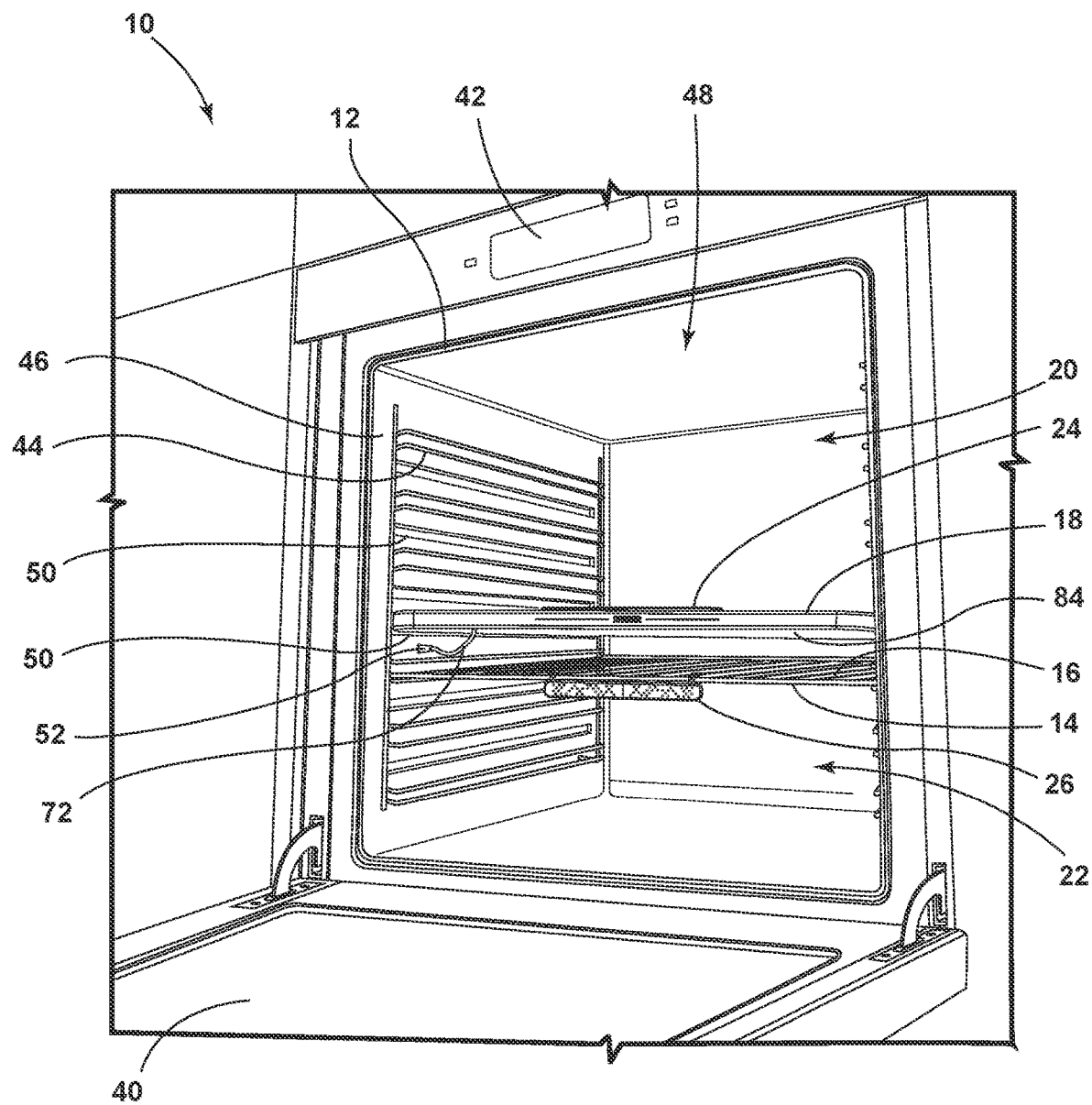
FIG. 1 is a partial front perspective view of a cooking appliance of the present disclosure.
Figure 2:
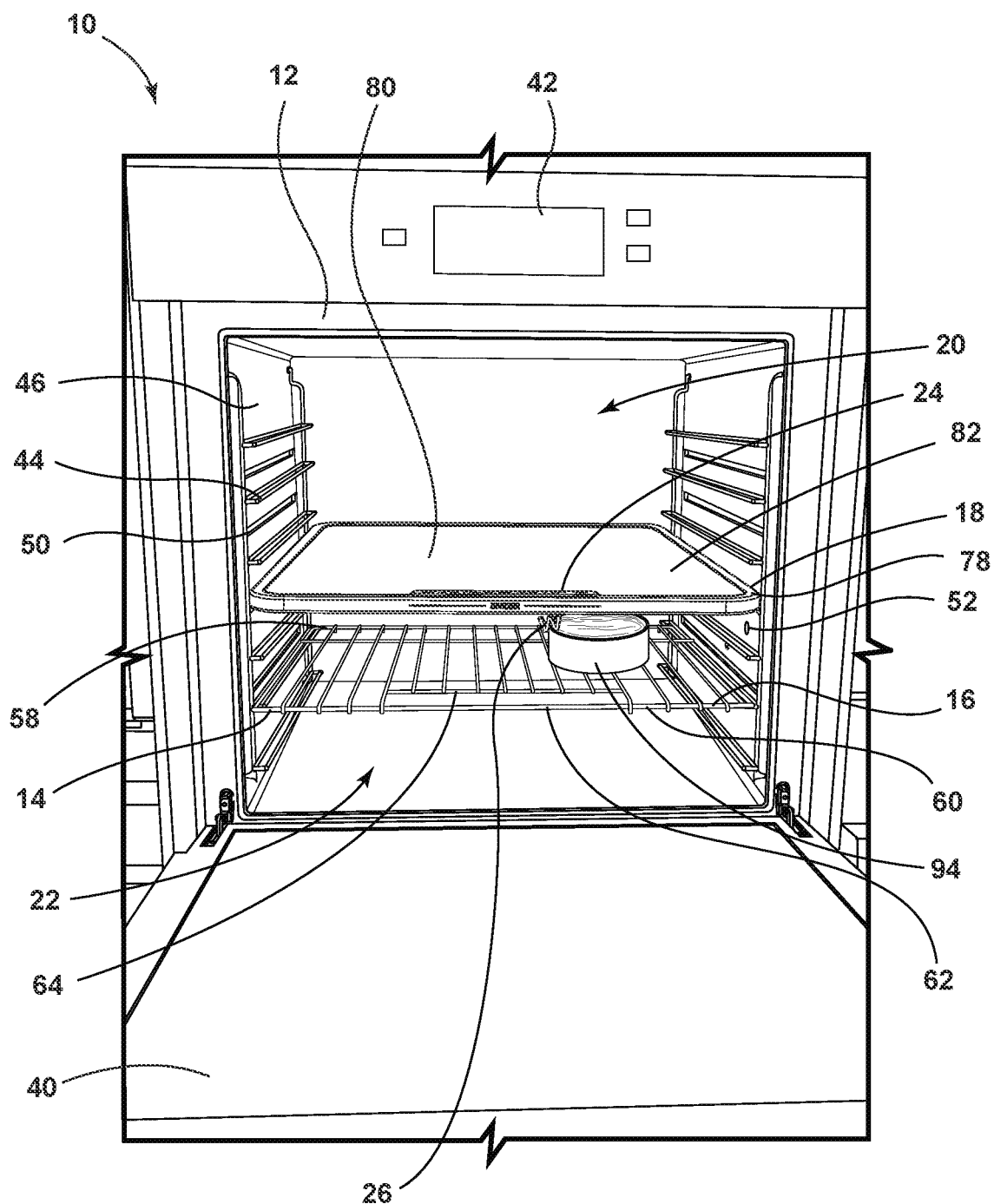
FIG. 2 is a partial front perspective view of a cooking appliance of the present disclosure with a cooking vessel on a rack.
Figure 3:
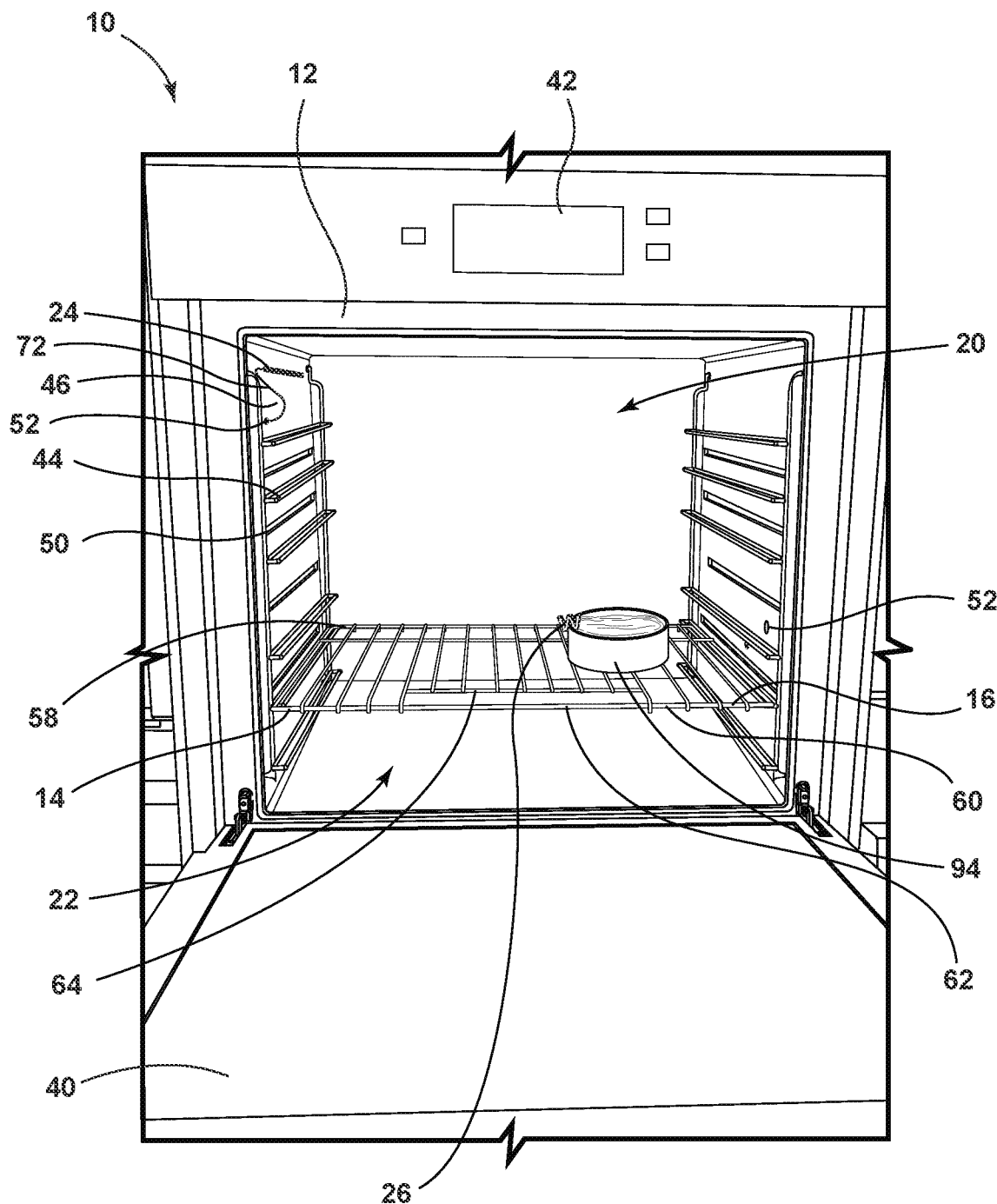
FIG. 3 is a partial front perspective view of a cooking appliance of the present disclosure with a first temperature sensor coupled to the cooking appliance and a second temperature sensor coupled to a cooking vessel on a rack.
Figure 4:
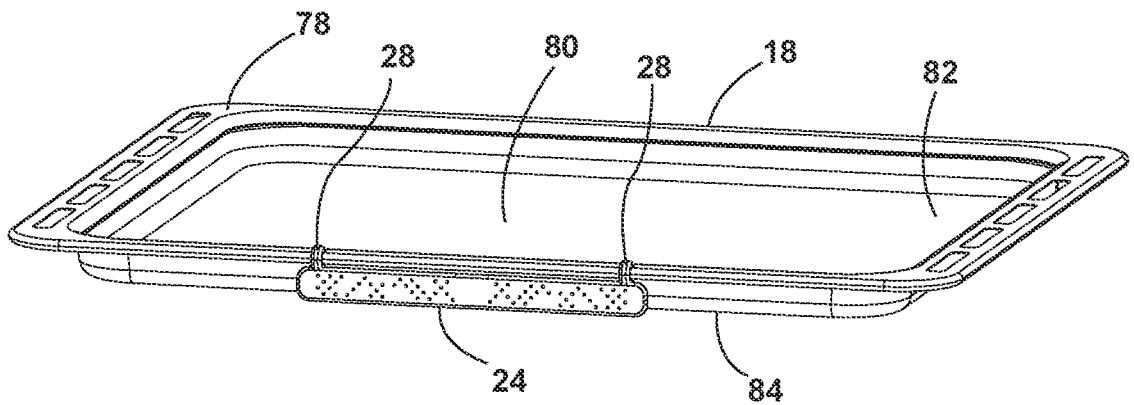
FIG. 4 is a top perspective view of a divider of the present disclosure with a temperature sensor.

The components in the figures are not necessarily to scale, emphasis instead being placed upon illustrating the principles described herein.

DETAILED DESCRIPTION

The present illustrated embodiments reside primarily in combinations of method steps and apparatus components related to temperature sensors for a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-12, reference numeral 10 generally designates a cooking appliance that includes a housing 12. A rack 14 is operably coupled to the housing 12 and has a frame 16. A divider 18 is operably coupled to the housing 12 proximate to the rack 14, and the divider 18 defines a first cavity 20 and a second cavity 22 of the housing 12. A first temperature sensor 24 is selectively coupled to the divider 18 and is configured to detect an air temperature $T_1$ of the first cavity 20. A second temperature sensor 26 is operably coupled to the frame 16 of the rack 14 via retention features 28 and is configured to detect an air temperature $T_2$ of the second cavity 22.

Referring to FIGS. 1-4, the cooking appliance 10 is illustrated as a built-in oven. It is also contemplated that the cooking appliance 10 may be a microwave, toaster oven, range, and other similar cooking appliances. As illustrated in FIG. 1, the cooking appliance 10 includes a door 40 that is operably coupled to the housing 12 and a user interface 42 that is operably coupled to the housing 12 proximate to the door 40. The housing 12 includes supports 44 defined along sidewalls 46 of the housing 12 within each of the first and second cavities 20, 22. It is generally contemplated that the first and second cavities 20, 22 collectively define a cooking cavity 48 of the cooking appliance 10. The first and second cavities 20, 22 may also be referred to as first and second cooking cavities 20, 22. Stated differently, the divider 18 is positioned within the cooking cavity 48 to define the first and second cooking cavities 20, 22. It is contemplated that the first and second cooking cavities 20, 22 may differ and/or may be similar in size depending on the placement of the divider 18 within the cooking cavity 48.

The sidewalls 46 of the housing 12 may also define divider channels 50 in which the divider 18 may be positioned to define the first and second cavities 20, 22. Additionally or alternatively, the divider 18 may be operably coupled to the supports 44. The divider 18 being positioned in one of the divider channels 50 can define a seal between the divider 18 and the sidewalls 46 to define the first and second cavities 20, 22. The seal assists in maintaining temperature separation between the first and second cavities 20, 22. The air temperature $T_1$, $T_2$ of each of the first and second cavities 20, 22 can be respectively regulated, so each of the first and second cavities 20, 22 may have a different air temperature $T_1$, $T_2$, respectively, as described in more detail below.

Referring still to FIGS. 1-4, the sidewalls 46 can also define a connector port 52 that is electrically coupled with the user interface 42, as described further below. It is also contemplated that multiple connector ports 52 may be defined along the sidewalls 46 in various locations. Typically, the connector ports 52 may be defined proximate to the supports 44 so as to be proximate to the rack 14. The rack 14 may be positioned upon the supports 44 to retain the rack 14 within the cooking cavity 48. The frame 16 of the rack 14 is generally defined by a perimeter rim 54 and includes spaced rails 56, which extend between a first end 58 and a second end 60 of the rack 14. The rack 14 may also have a front portion 62 that defines a horizontal aperture 64. As described below, it is generally contemplated that the second temperature sensor 26 can be coupled to the rack 14 at the front portion 62. The second temperature sensor 26 may translate between a first position and a plurality of second positions along the front portion 62 of the rack 14.

With reference now to FIGS. 3-7, the first temperature sensor 24 can be coupled to the divider 18, as described below, and the second temperature sensor 26 can be coupled to the rack 14. Additionally or alternatively, the second temperature sensor 26 may be coupled to the divider 18 within the second cavity 22. In a further alternate configuration, illustrated in FIG. 3, the first temperature sensor 24 may be selectively coupled to one of the sidewalls 46 of the housing 12 within the cooking cavity 14 when the divider 18 is removed from the cooking cavity 14. It is generally contemplated that the first temperature sensor 24 may be magnetically coupled to the sidewalls 46 of the housing 12 in any practicable location for detecting the air temperature $T_1$ of the cooking cavity 14. In such configuration, it is generally contemplated that a third temperature sensor may be coupled to the divider 18 if the user positions the divider 18 within the cooking cavity 48. Each of the first and second temperature sensors 24, 26 include a body 70 from which a cable 72 may extend. The cable 72 may be selectively coupled with the connector port 52, as described further below. It is contemplated that the retention features 28 may be coupled. The retention features 28 may be configured as a single retention feature and/or multiple retention features coupled to the body 70. It is also contemplated that the retention features 28 may be integrally formed with the body 70.

The first temperature sensor 24 may have a single retention feature 28, which is illustrated as being disposed along a rear surface 74 of the first temperature sensor 24. By way of example, not limitation, the retention feature 28 of the first temperature sensor 24 may be formed from a magnet configured to selectively couple the first temperature sensor 24 to the divider 18. The incorporation of the retention features 28 with the first temperature sensor 24 assists the user in positioning the first temperature sensor 24 in various locations with respect to the divider 18, such that the first temperature sensor 24 may be selectively removable from the divider 18. For example, a user can remove and adjust the first temperature sensor 24 along the divider 18 to detect the air temperature $T_1$ in various locations along the divider 18. It is also contemplated that the first temperature sensor 24 may be integrally formed with the divider 18, as described below. It is further contemplated that multiple temperature sensors 76 may be coupled to the divider 18 within the first cooking cavity 20.

Figure 5:
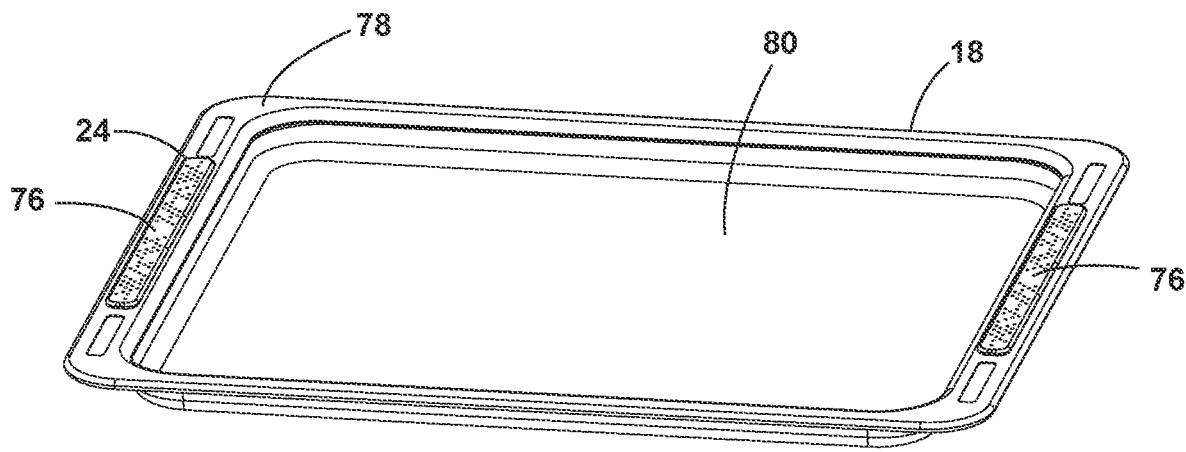
FIG. 5 is a top perspective view of a divider of the present disclosure with multiple temperature sensors.
Figure 6:
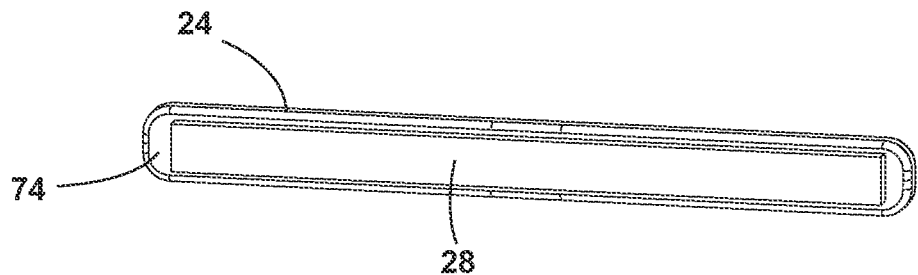
FIG. 6 is a rear perspective view of a temperature sensor of the present disclosure with a retention feature.
Figure 7:
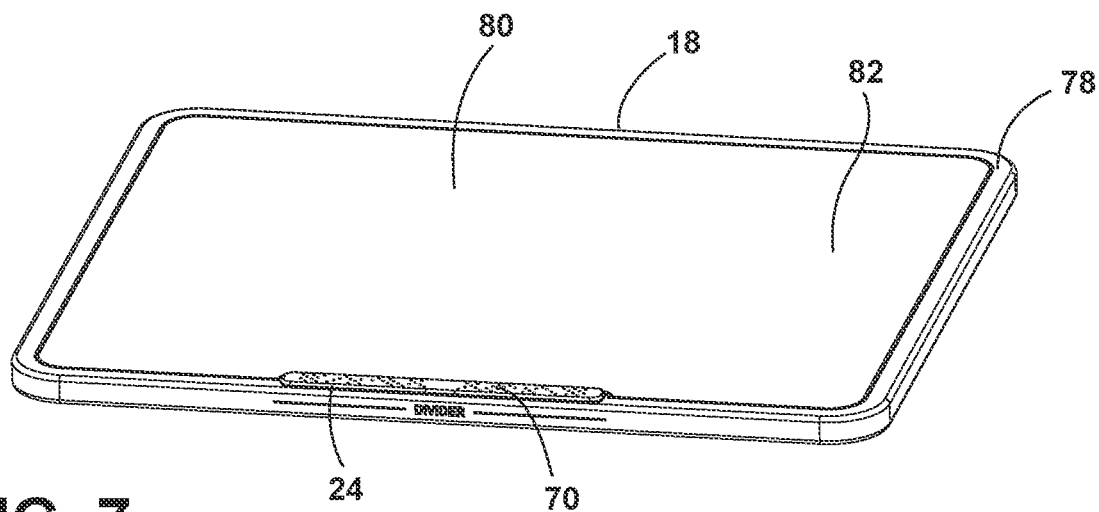
FIG. 7 is a top perspective view of a divider of the present disclosure with a temperature sensor.

With further reference to FIGS. 4-7, the divider 18 may include a peripheral edge 78 disposed around a central portion 80 of the divider 18. It is contemplated that the peripheral edge 78 may be raised relative to the central portion 80 to offset the peripheral edge 78 toward the respective cavities 20, 22. Additionally or alternatively, the central portion 80 may be coplanar with the peripheral edge 78. The divider 18 has a first side 82 and a second side 84. For example, the first side 82 may be positioned toward the first cavity 20, and the second side 84 may be positioned toward the second cavity 22. The first temperature sensor 24 may be coupled to the first side 82 of the divider 18 along the peripheral edge 78. Additionally or alternatively, the first temperature sensor 24 may be coupled to the central portion 80 of the divider 18. As illustrated in FIG. 5, the multiple temperature sensors 76 are coupled to the peripheral edge 78 and may be proximate the sidewalls 46 (FIG. 1) of the housing 12. It is generally contemplated that the air temperature detected by the multiple temperature sensors 76 may be utilized to determine the air temperature $T_1$ of at least the first cavity 20. It is also contemplated that multiple temperature sensors 76 may be utilized within the second cavity 22. For example, the temperature sensors 76 may be coupled to either the first die 82 and/or the second side 84 of the divider 18. It is further contemplated that the third temperature sensor may be configured as either of the multiple temperature sensors 76 and/or may be coupled to the divider 18 independent of any other temperature sensors 76.

As mentioned above, the first temperature sensor 24 may be integrally formed with the divider 18. In some configurations, the cable 72 may extend from the divider 18 to couple the first temperature sensor 24 to the connector port 52 defined by the sidewalls 46 of the cooking appliance 10. For example, the connector port 52 may be defined proximate to one of the divider channels 50, such that the cable 72 may extend a short distance from the divider 18 to couple to the connector port 52. The second temperature sensor 26 may also include the cable 72 that couples the second temperature sensor 26 to the cooking appliance 10 via one of the connector ports 52. Additionally or alternatively, the first temperature sensor 24 and/or the second temperature sensor 26 may be configured as a wireless sensor, as described in more detail below.

Figure 8:
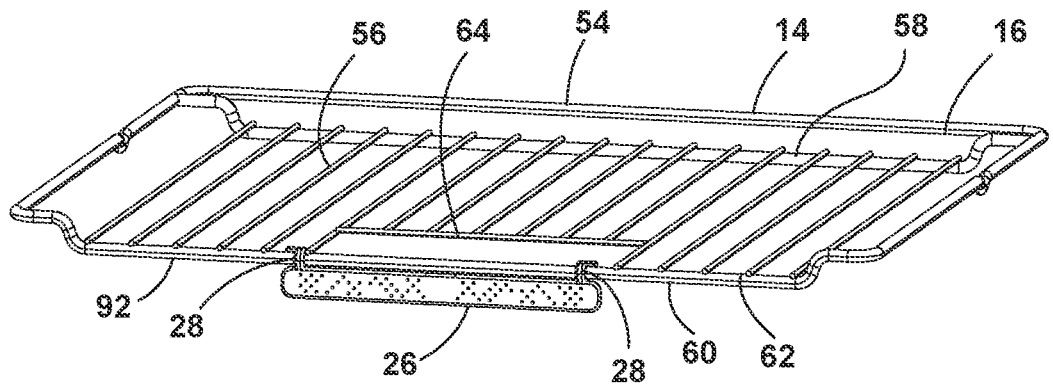
FIG. 8 is a top perspective view of a rack of the present disclosure with a temperature sensor suspended from a front portion of the rack.
Figure 9:
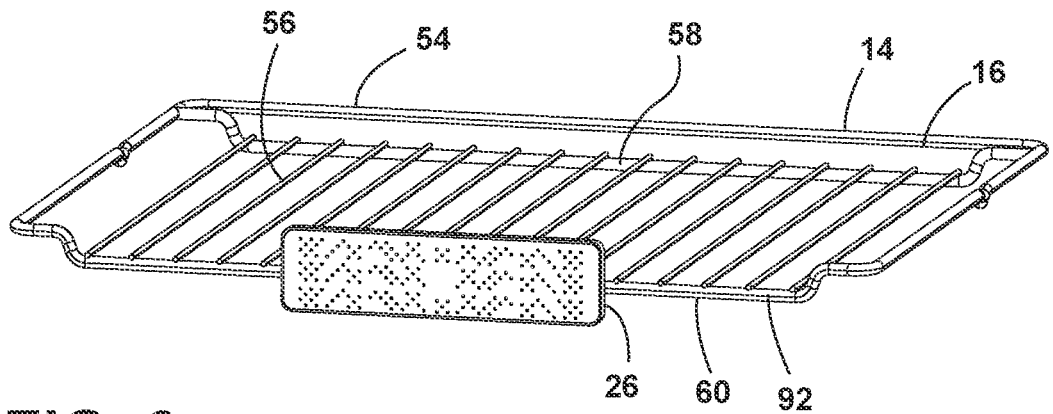
FIG. 9 is a top perspective view of a rack of the present disclosure with a temperature sensor coupled to a front portion of the rack.
Figure 10:
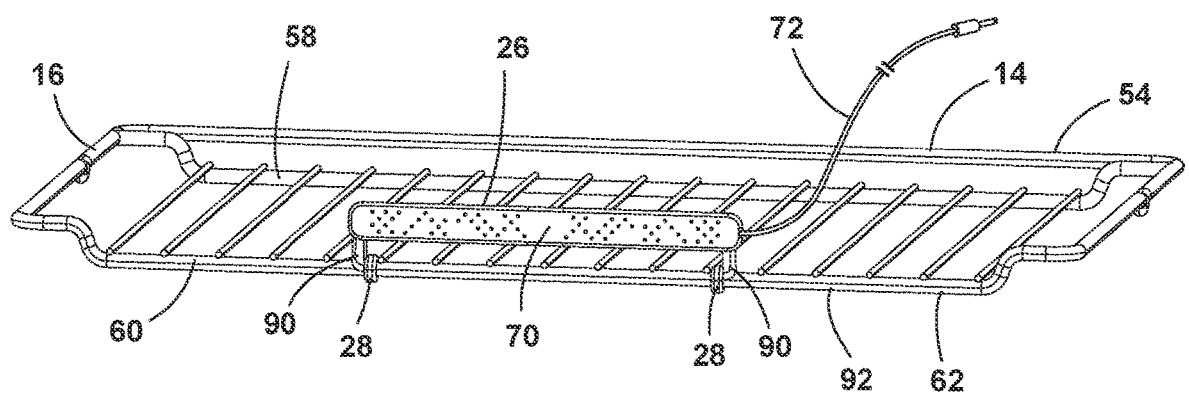
FIG. 10 is a top perspective view of a rack of the present disclosure with a temperature sensor extending above a front portion of the rack.

Referring to FIGS. 2 and 8-11, the second temperature sensor 26 includes the retention features 28, which can extend around the frame 16 of the rack 14. It is generally contemplated that the retention features 28 can be coupled to the body 70 of the second temperature sensor 26 via support portions 90 that extend from the retention features 28 and are coupled to the body 70. The support portions 90 may support the second temperature sensor 26 above the frame 16 of the rack 14, such that the second temperature sensor 26 extends beyond a front edge 92 of the rack 14. As illustrated in FIGS. 9 and 10, the second temperature sensor 26 at least partially extends above the frame 16 of the rack 14. Additionally or alternatively, the support portions 90 may suspend the second temperature sensor 26 from the frame 16 of the rack 14, as illustrated in FIG. 8. The second temperature sensor 26 may rotate about the frame 16 between extended and suspended positions to detect the air temperature $T_2$ in various locations within the second cavity 22. The second temperature sensor 26 may also slide along the frame 16 of the rack 14 via the retention features 28.

Additionally or alternatively, the second temperature sensor 26 may be generally fixedly coupled to the rack 14, while still operable between the first position and the plurality of second positions along the frame 16. For example, the retention features 28 may be disposed around the perimeter rim 54 of the rack 14, such that the second temperature sensor 26 may be fixed about the perimeter rim 54 while also being slidably coupled to the front portion 62 of the rack 14. Stated differently, the second temperature sensor 26 may be slidably coupled to the frame 16 of the rack 14 and can translate along the frame 16 between the first position and the plurality of second positions. Additionally or alternatively, the second temperature 26 may be fixedly coupled to the rack 14 via spot welding. It is further contemplated that the second temperature sensor 26 may be coupled a cooking vessel 94 that may be positioned on the rack 14. It is further contemplated that the first temperature sensor 24 may be coupled to the first side 82 of the divider 18 while the second temperature sensor 26 may be coupled to the second side 84 of the divider 18.

Figure 11:
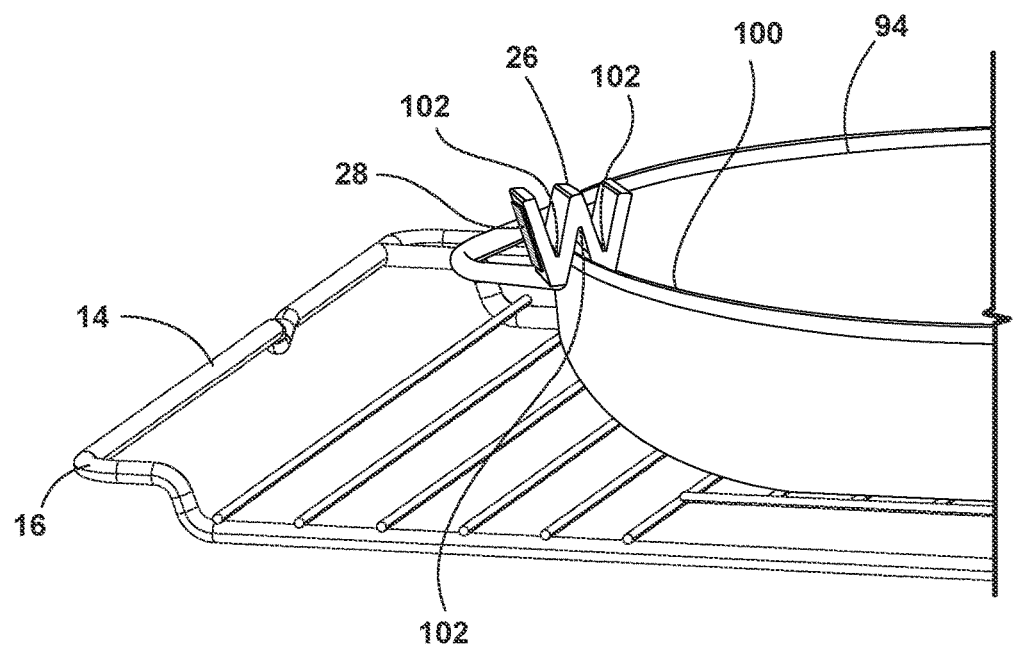
FIG. 11 is a partial enlarged side perspective view of a cooking vessel with a temperature sensor of the present disclosure coupled to an edge of the cooking vessel.
Figure 12:
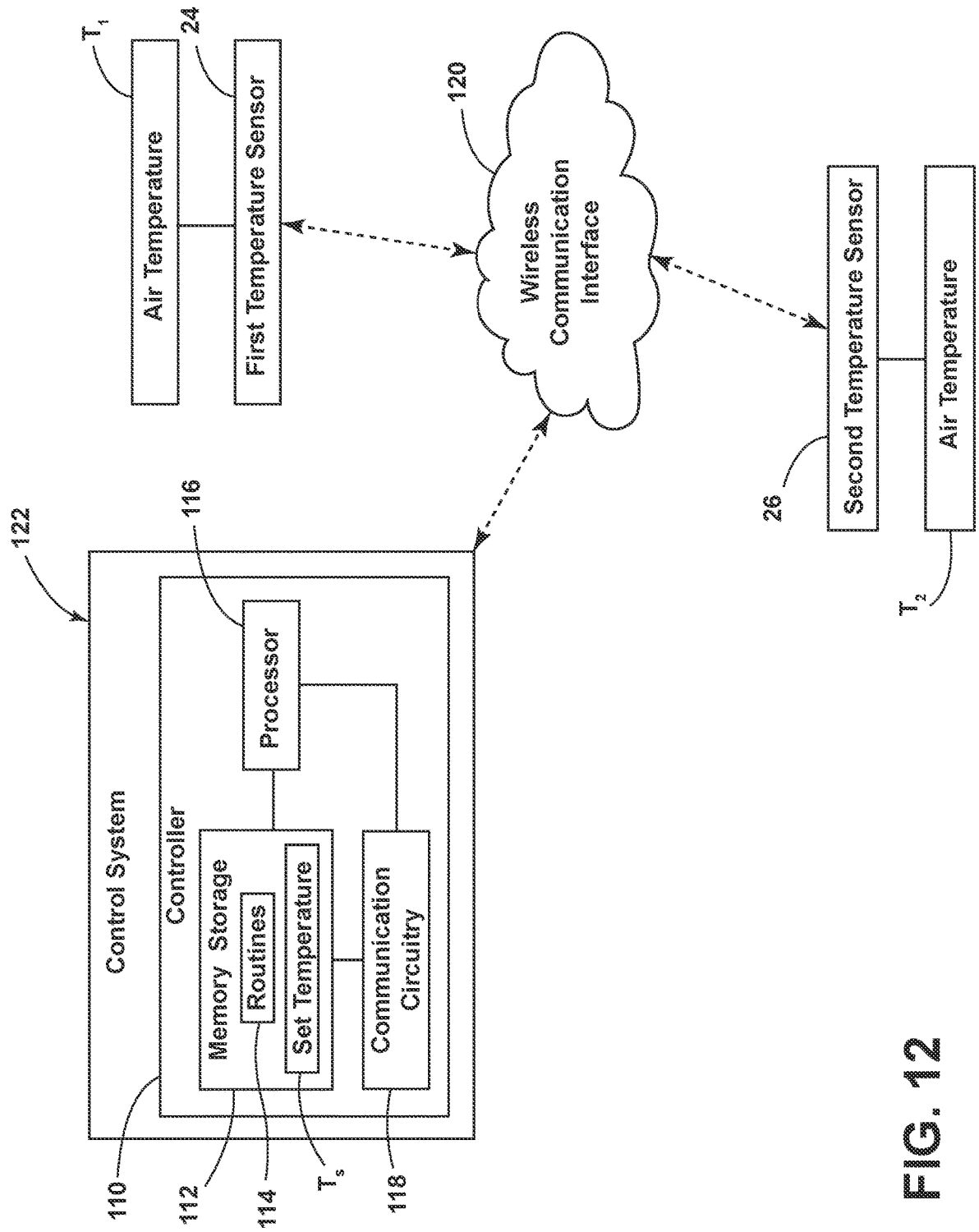
FIG. 12 is a schematic block diagram of a control system of a cooking appliance and temperature sensors of the present disclosure.

With further reference to FIGS. 2 and 8-11, the cooking vessel 94 may be positioned within the second cooking cavity 22 on the rack 14, and the second temperature sensor 26 may be coupled to an edge 100 of the cooking vessel 94. By way of example, not limitation, the cooking vessel 94 is illustrated as a pot with the second temperature sensor 26 being coupled to the edge 100 of the cooking vessel 94. It is generally contemplated that the second temperature sensor 26 may be coupled to the cooking vessel 94 via the retention features 28. As depicted in FIG. 11, the second temperature sensor 26 is illustrated as having a W-configuration, such that the temperature sensor 26 defines a plurality of notches 102. In this configuration, the plurality of notches 102 may replace the retention features 28. The second temperature sensor 26 may be disposed on the edge 100 of the cooking vessel 94, such that the edge 100 can be positioned in one of the notches 102 to retain the second temperature sensor 26. Additionally or alternatively, the second temperature sensor 26 may include at least one of the retention features 28 in addition to the plurality of notches 102. For example, the second temperature sensor 26 may include a magnet 28 as an additional retention feature 28 to magnetically couple the second temperature sensor 26 to the cooking vessel 94.

Referring again to FIGS. 1-12, the first and second temperature sensors 24, 26 are communicatively coupled to a controller 110 of the cooking appliance 10. The controller 110 may include a memory storage 112 that can be configured with routines 114. The controller 110 may also be configured with a processor 116 and other control circuitry. The processor 116 is configured to execute the routines 114 stored in the memory storage 112 based on the data and/or communications received by the controller 110.

The other control circuitry of the controller 110 may include communication circuitry 118 for bidirectional communication. For example, the controller 110 may be communicatively coupled with a wireless communication interface 120, described below, via the communication circuitry 118. While the memory storage 112 can be included within the controller 110, cloud storage, or other remotely accessible memory interfaces can also be used instead of or in combination with the memory storage 112.

The wireless communication interface 120 may be implemented via one or more direct or indirect nonhierarchical communication protocols, including but not limited to, Bluetooth®, Bluetooth® low energy (BLE), Thread, Ultra-Wideband, Z-wave, ZigBee, etc. Additionally, the wireless communication interface 120 may correspond to a centralized or hierarchal communication interface 120 where one or more of the devices communicate via a wireless router (e.g., a communication routing controller). Accordingly, the wireless communication interface 120 may be implemented by a variety of communication protocols, including, but not limited to, global system for mobile communication (GSM), general packet radio services, code division multiple access, enhanced data GSM environment, fourth-generation (4G) wireless, fifth-generation (5G) wireless, Wi-Fi, world interoperability for wired microwave access (WiMAX), local area network, Ethernet, etc. By flexibly implementing the communication interface 120, the various devices and servers may be in communication with one another directly via the wireless communication interface 120 or a cellular data connection.

The controller 110 disclosed herein may include various types of control circuitry, digital or analog, and may include a processor, a microcontroller, an application specific integrated circuit (ASIC), or other circuitry configured to perform the various inputs or outputs, control, analysis, or other functions described herein. The memory described herein may be implemented in a variety of volatile and nonvolatile memory formats. The routines 114 may include operating instructions to enable the various methods described herein.

With further reference to FIGS. 1-12, the first and second temperature sensors 24, 26 are communicatively coupled to the controller 110. For example, each of the first and second temperature sensors 24, 26 can be coupled to the controller 110 via the cable 72 being coupled to the connector ports 52 defined by the housing 12. Additionally or alternatively, the first and/or second temperature sensor(s) 24, 26 may be configured to wirelessly communicate with the controller 110 via the wireless communication interface 120. For example, the first and second temperature sensors 24, 26 communicate with the controller 110 via the wireless communication interface 120 to transmit temperature data of each of the first and second cavities 20, 22.

The first temperature sensor 24 detects the air temperature $T_1$ of the first cavity 20, and the second temperature sensor 26 detects the air temperature $T_2$ of the second cavity 22. The detected air temperatures $T_1$, $T_2$ are received by the controller 110 and can be compared with a set temperature $T_S$ of the respective cavities 20, 22. The user can set the set temperature $T_S$ of each of the first and second cavities 20, 22, and the controller 110 can compare the detected temperatures $T_1$, $T_2$ with the set temperature $T_S$. If the air temperature $T_1$, $T_2$ of either of the first and/or second cavities 20, 22 does not match the set temperature $T_S$, then the controller 110 can adjust the respective temperature $T_1$, $T_2$.

With further reference to FIGS. 1-12, it is generally contemplated that the first and second temperature sensors 24, 26 and the controller 110 are part of a control system 122 of the cooking appliance 10. The control system 122 may also include the user interface 42, which is communicatively coupled with the controller 110. The user may operate and otherwise control the cooking appliance 10 via the user interface 42 and the controller 110. For example, the user may input the set temperature $T_S$ for each of the cooking cavities 20, 22. The controller 110 may compare the set temperature $T_S$ input by the user with the detected temperature data received from the first and second temperature sensors 24, 26. The user interface 42 may indicate the temperatures $T_1$, $T_2$ of the first and second cooking cavities 20, 22 and may display the temperature data received by the controller 110 via the first and second temperature sensors 24, 26.

The controller 110 may receive a first temperature signal from the first temperature sensor 24 that corresponds to the air temperature $T_1$ of the first cooking cavity 20, and the controller 110 may receive a second temperature signal from the second temperature sensor 26 that corresponds to the air temperature $T_2$ of the second cooking cavity 22. For example, the controller 110 can be configured to adjust the air temperature $T_1$ of the first cavity 20 in response to the detected temperature signal received from the first temperature sensor 24. The controller 110 can compare the signals received with the set temperatures $T_S$ in each respective cavity 20, 22. Stated differently, the controller 110 can independently control, operate, and/or otherwise adjust the temperatures of each respective cavity 20, 22 independent of one another. By way of example, not limitation, the controller 110 can adjust the temperature of the first cavity 20 while maintaining the temperature of the second cavity 22.

Referring still to FIGS. 1-12, the second temperature sensor 26 can be coupled to the cooking vessel 94, such that the second signal corresponds to the air temperature $T_2$ proximate to the cooking vessel 94. The controller 110 can compare the second signal to the set temperature $T_S$ of the second cooking cavity 22 to determine whether the temperature $T_2$ should be adjusted. The placement of the second temperature sensor 26 proximate to the cooking vessel 94 assists in further pinpointing the temperature of the air most proximate to the item being cooked. If the controller 110 determines that the second signal differs from the set temperature $T_S$ then the air temperature $T_2$ of the second cooking cavity 22 can be adjusted. The controller 110 may be configured to conduct a similar comparison of the first signal with the set temperature $T_S$ for the first cooking cavity 20.

It is further contemplated that the first and second temperature sensors 24, 26 may be utilized within the cooking cavity 48 where the divider 18 may be removed. In such configuration, the first temperature sensor 24 may be removed from the divider 18 and coupled to the rack 14 and/or one of the sidewalls 46 of the housing 12. The use of the first and second temperature sensors 24, 26 within the cooking cavity 48 that is free from the divider 18 assists in regulating and/or maintaining a consistent temperature within the cooking cavity 48. For example, each of the temperature sensors 24, 26 may be positioned at varied locations within the housing 12 to detect the air temperatures $T_1$, $T_2$ in multiple locations within the cooking cavity 48.

With reference still to FIGS. 1-12, the first and second temperature sensors 24, 26 assist the user in monitoring and regulating the air temperatures $T_1$, $T_2$ of the first and second cooking cavities 20, 22, respectively. The placement of the first temperature sensor 24 along the divider 18 assists in detecting the temperature $T_1$ of the first cooking cavity 20, which is separated from the second cooking cavity 22 via the divider 18. Meanwhile, the second temperature sensor 26 can be positioned proximate to the cooking vessel 94 to detect the air temperature $T_2$ around the cooking vessel 94. Additionally or alternatively, the second temperature sensor 26 can be positioned on the rack 14 to more generally detect the air temperature $T_2$ of the second cavity 22.

In either configuration, the detected temperatures $T_1$, $T_2$ of the first and second cavities 20, 22 can be compared with the set temperature $T_S$ by the controller 110. Stated differently, the air temperature $T_1$, $T_2$ of the first and second cavities 20, 22, respectively, is independently regulated via the controller 110. For example, the controller 110 is configured to adjust the air temperature $T_1$ in response to the first signal received from the first temperature sensor 24. Thus, the controller 110 can cooperate with the first and second temperature sensors 24, 26 to reach and maintain the set temperature of the cooking cavity 48 and/or the first and second cooking cavities 20, 22 via the first and second temperature sensors 24, 26.

The invention disclosed herein is further summarized in the following paragraphs and is further characterized by combinations of any and all of the various aspects described therein.

According to one aspect of the present disclosure, a cooking appliance includes a housing that includes a rack that is coupled to the housing and has a frame. A divider is coupled to the housing proximate the rack. The divider defines a first cavity and a second cavity of the housing. A first temperature sensor is selectively coupled to the divider. The first temperature sensor is configured to detect an air temperature of the first cavity. A second temperature sensor is operably coupled to the frame of the rack via retention features. The second temperature sensor is configured to detect an air temperature of the second cavity.

According to another aspect, a controller is operably coupled to a housing and is communicatively coupled to a first temperature sensor and a second temperature sensor.

According to another aspect, an air temperature of a first cavity and a second cavity is independently regulated via a controller.

According to another aspect, a controller is configured to adjust an air temperature of a first cavity to a first temperature in response to a detected temperature signal received from a first temperature sensor.

According to another aspect, a first temperature sensor includes a magnet and is selectively coupled to a divider via a magnet.

According to another aspect, retention features of a second temperature sensor are operably coupled to a front edge of a rack, and a second temperature sensor extends beyond the front edge of the rack via the retention features.

According to another aspect, a second temperature sensor is slidably coupled to a frame of a rack and translates along the frame between a first position and a plurality of second positions.

According to another aspect of the present disclosure, a cooking appliance includes a housing that defines a cooking cavity. A first temperature sensor is selectively coupled to the housing and is configured to detect an air temperature of the cooking cavity. A rack is disposed within the cooking cavity and includes a second temperature sensor that is coupled to a frame of the rack.

According to another aspect, a controller is communicatively coupled to a first temperature sensor and a second temperature sensor.

According to another aspect, a second temperature sensor includes a cable that communicatively couples the second temperature sensor to a controller.

According to another aspect, a housing defines a connector port, and a first temperature sensor includes a cable that communicatively couples the first temperature sensor to a controller and is operably coupled to a connector port.

According to another aspect, a first temperature sensor has a body and a magnet that is coupled to a body, and the magnet selectively couples the first temperature sensor to a divider.

According to another aspect, a divider is disposed within a cooking cavity and defines a first cooking cavity and a second cooking cavity. A third temperature sensor is selectively coupled to the divider in the first cooking cavity, and a second temperature sensor is positioned within the second cooking cavity.

According to another aspect, a second temperature sensor includes retention features and is removably coupled to a rack via retention features.

According to yet another aspect of the present disclosure, a cooking appliance includes a housing that includes a divider that defines a first cavity and a second cavity. A first temperature sensor is integrally formed with the divider and is configured to detect an air temperature of the first cavity. A cooking vessel is disposed within the second cavity. A second temperature sensor is selectively coupled to the cooking vessel and is configured to detect an air temperature of the second cavity proximate the cooking vessel.

According to another aspect, a controller is communicatively coupled to a first temperature sensor and a second temperature sensor, and a controller is configured to adjust an air temperature of a first cavity and a second cavity.

According to another aspect, a controller is configured to adjust an air temperature of a first cavity in response to the air temperature detected by a first temperature sensor.

According to another aspect, a second temperature sensor has a W-configuration and is operably coupled to an edge of a cooking vessel.

According to another aspect, a second temperature sensor includes a magnet, and the second temperature sensor is magnetically coupled to a cooking vessel via the magnet.

According to another aspect, a rack is disposed within a second cavity of a housing, and a second temperature sensor is selectively coupled to a rack and is configured to detect an air temperature of a second cavity proximate to the rack.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
   a housing;
   a rack coupled to the housing and having a frame;
   a divider having a central region surrounded by a raised peripheral edge on all four sides of the central region, said divider coupled to the housing proximate the rack, the divider defining a first cavity and a second cavity of the housing;
   a first temperature sensor coupled to an upper portion of said raised peripheral edge of said divider, the first temperature sensor configured to detect an air temperature of the first cavity; and
   a second temperature sensor coupled to the frame of the rack via retention features, the second temperature sensor configured to detect an air temperature of the second cavity.

2. The cooking appliance of claim 1, further comprising:
   a controller operably coupled to the housing and communicatively coupled to each of the first temperature sensor and the second temperature sensor.

3. The cooking appliance of claim 2, wherein the air temperature of each of the first cavity and the second cavity is independently regulated via the controller.

4. The cooking appliance of claim 3, wherein the controller is configured to adjust the air temperature of the first cavity to a first temperature in response to a detected temperature signal received from the first temperature sensor.

5. The cooking appliance of claim 1, wherein the first temperature sensor includes a magnet and is selectively coupled to the divider via the magnet.

6. The cooking appliance of claim 1, wherein the retention features of the second temperature sensor are coupled to a front edge of the rack, and further wherein the second temperature sensor extends beyond the front edge of the rack via the retention features.

7. The cooking appliance of claim 1, wherein the second temperature sensor is slidably coupled to the frame of the rack and translates along the frame between a first position and a plurality of second positions.

8. A cooking appliance, comprising:
a housing including a divider with a central region surrounded by a raised peripheral edge on all four sides of said central region that defines a first cavity and a second cavity;
a first temperature sensor integrally included on an upper portion of said raised peripheral edge of said divider and configured to detect an air temperature of the first cavity;
a cooking vessel disposed within the second cavity; and
a second temperature sensor coupled to the cooking vessel and configured to detect an air temperature of the second cavity proximate the cooking vessel.

9. The cooking appliance of claim 8, further comprising:
a controller communicatively coupled to each of the first temperature sensor and the second temperature sensor, wherein the controller is configured to adjust the air temperature of each of the first cavity and the second cavity.

10. The cooking appliance of claim 9, wherein the controller is configured to adjust the air temperature of the first cavity in response to the air temperature detected by the first temperature sensor.

11. The cooking appliance of claim 8, wherein the second temperature sensor has a W-configuration and has a notch that is coupled to an edge of the cooking vessel.

12. The cooking appliance of claim 8, wherein the second temperature sensor includes a magnet, and further wherein the second temperature sensor is magnetically coupled to the cooking vessel via the magnet.

13. The cooking appliance of claim 8, further comprising:
a rack disposed within the second cavity of the housing, wherein the second temperature sensor is coupled to the rack and configured to detect the air temperature of the second cavity proximate to the rack.

* * * * *